June 1, 1948.  I. A. GOLDMAN  2,442,648
AUTOMATIC AIR PRESSURE GUN
Filed Nov. 14, 1945
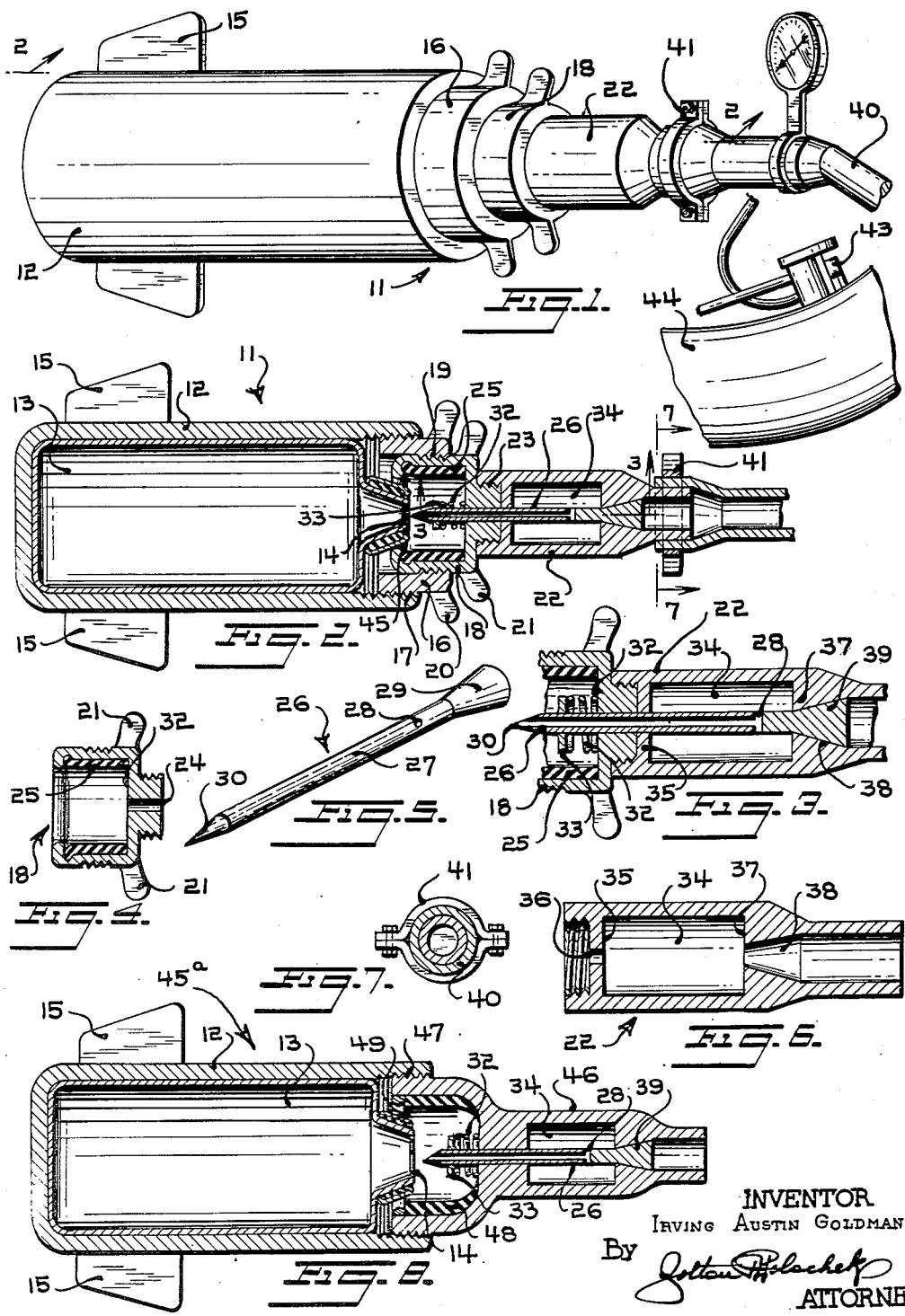
INVENTOR.
IRVING AUSTIN GOLDMAN
By Zoltan Pilochek
ATTORNEY Patented June 1, 1948

2,442,648

UNITED STATES PATENT OFFICE 2,442,648

AUTOMATIC AIR PRESSURE GUN

Irving Austin Goldman, Alexandria, Va.

Application November 14, 1945, Serial No. 628,504

4 Claims. (Cl. 222—5)

This invention relates to compressed air dispensing devices, and more particularly to an automatic air pressure gun having a compressed air cartridge, means to puncture the cartridge to release the air and means to regulate and control the flow of air therefrom.

An object of the invention is to provide a convenient supply of air under pressure in the form of a cartridge that is available for emergencies and at other times.

Another object is to incorporate the cartridge in a device that can safely release the air therefrom for use and that can control, regulate and shut off the flow of air until the supply has been exhausted.

A further object is to provide an automatic air pressure gun with means to puncture a cartridge to release air under pressure and automatically operate a valve to control the air flow therefrom.

Another object is to provide an automatic air pressure gun having a movable pin in a gun barrel, the pin being capable of puncturing a compressed air cartridge and forming part of a valve to control the flow of air therefrom.

Still another object is to provide a pin for an automatic air gun that has a head that can function as a valve face to coact with a valve seat in a gun barrel to form an air valve.

A further object is to provide the pin with a hollow shank having a vent near the head of the pin to permit air to flow into an opening in the pin point, through the shank of the pin, and out of the vent into an air chamber in the gun barrel.

Another object is to provide means to operate the device to open the valve automatically as the air cartridge is punctured.

These and other objects are accomplished by providing a container having an open end, a cartridge of compressed air having a sealed end that can be punctured and a barrel having an opening therethrough with a valve seat, a pin, a spring and a disk therein. The cartridge is positioned in the container with its sealed end near the cartridge opening.

The pin has a head that can function as a valve face and coact with the valve seat in the barrel to form an air valve. The spring acts on the disk which is positioned on and secured to the pin shank, keeping the valve in closed position. The disk also acts as a stop to limit the movement of the pin and is capable of engaging the end of the cartridge. The container and barrel are detachably secured to each other by coacting threading means with the pin point aligned near the sealed end of the cartridge. As the container is turned or threaded onto the barrel, the pin point advances and punctures the cartridge seal, then the disk engages the end of the cartridge and the pin is moved back against the action of the spring, thus opening the air valve. When the container is threaded in reverse, the disk is disengaged, and the spring closes the valve again.

The gun barrel with its parts can also be used with a tank having suitable fittings as well as with the container and cartridge.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of an automatic air pressure gun embodying the invention herein, the gun being joined to an air hose provided with a pressure gauge and a tire to illustrate one of its uses.

Fig. 2 is a section along the line 2—2 of Fig. 1.

Fig. 3 is an enlarged section along the line 3—3 of Fig. 2.

Fig. 4 is an enlarged longitudinal cross section of a fitting of the pressure gun shown in Fig. 1.

Fig. 5 is a perspective view of a pin used in the pressure gun.

Fig. 6 is an enlarged longitudinal cross section of a housing of the pressure gun.

Fig. 7 is a transverse section along the line 7—7 of Fig. 2.

Fig. 8 is a cross section of a variation of the invention along a line corresponding to 2—2 of Fig. 1.

In the drawings and in the specification, in which like reference numbers designate similar parts, the automatic air pressure gun 11 embodying this invention and shown in Figs. 1 to 7 inclusive, is provided with a container 12 capable of retaining a cartridge 13 of compressed air having a sealed end 14 that can be punctured. The container 12 has two large fins or wings 15 that serve as gripping elements for turning or screwing it to a coupling 16.

The coupling 16 is detachably secured at one end to the container by coacting threading means 17 and at the other end to a fitting 18 by coacting threading means 19, and is also provided with two fins or wings 20 to facilitate handling and for adjustment.

The fitting 18 is likewise provided with two fins 21 and is removably secured at its other end to a housing 22 by coacting threading means 23, the fitting and housing together forming the barrel of the gun. The fitting 18 has a comparatively narrow opening 24 leading into the housing 22 and a soft rubber washer 25 extending around its inside cylindrical surface to make it airtight when coupled in functioning position. A plunger or pin 26 having a hollow shank 27 with ports or vents 28 near its conical head or valve face 29, is positioned with its point 30 inside the fitting 18 and a portion of the shank 27 fitting slidably in the opening 24. A helical spring 32 is disposed within the fitting 18 and around a portion of the pin shank 27 with one end in contact with a wall 31 having the opening 24 and the other end acting on a plate or disk 33 positioned on and secured to the pin shank near its point 30.

The housing 22 has an air chamber 34, a wall 35 near one end with a narrow opening 36, a wall 37 near the other end with a conical opening or valve seat 38 adapted to coact with the valve face 29 on the pin to form an air valve 39. When the container, coupling, fitting and housing are secured together, the openings and air chamber form an airtight passage. The automatic air pressure gun 11 is operated as follows:—The automatic air pressure gun 11 is secured to an air hose 40 by a clamp 41 (see Figs. 1 and 7) adapted to seal the connection and make it airtight. The hose 40 can be provided with an air pressure gauge 42, and the other end of the hose can be secured to a tube valve 43 of a tire 44 or to any other device requiring to be filled with air under pressure.

The container 12 is then grasped by its fins 15 and turned or screwed onto the coupling 16 until the pin point 30 punctures the cartridge seal 14, releasing the compressed air from the cartridge 13. As the coupling advances, the plate or disk 33 engages or comes into contact with the cartridge outlet face 45, and as the coupling is advanced further, the plate and the pin are pressed back against the action of the spring 32, moving the pin valve face 29 from the valve seat 38 opening the valve face 39. The air under pressure enters the hollow pin shank 27 passes through the vents 28, into the air chamber 34, through the valve 39 into the hose 40, pressure gauge 42 and through the tube valve 43 of a tire 44.

When the tube is filled to the desired pressure, the container is turned in reverse by its fins 15 withdrawing the plate 33 from its outlet face. The spring 32 then acts against the plate to force it and the pin forward closing the valve. The remaining compressed air is now held in the cartridge and in the airtight inner openings and air chamber of the coupling, fitting and housing, to be used thereafter in the manner hereinabove described until the supply has been exhausted.

While the gun 11 has been shown and described with the coupling 16, the device can also function with the fitting 18 connected directly to the container 12 eliminating the coupling. However, the coupling 16 serves a useful purpose as an adjusting means to position the pin point 30 with respect to the cartridge seal 14.

If desired housing 22 may be provided with a suitable fitting, such as a tire valve, making it possible to connect housing 22 with a reservoir tank holding 250 lbs. compressed air for industrial purposes, such as paint, spraying, etc. In such a case a trigger arrangement may be provided for releasing the air from the reservoir tank into a paint spray gun chamber, for instance.

At the same time a suitable valve would be provided for releasing air into the gauge for the purpose of checking on the amount of air within the cartridge.

When desired many improvements are possible. The device may be provided with an automatic arrangement whereby a plurality of cartridges would be used, each cartridge being automatically released as needed.

The gun 11 can also be used in conjunction with a tank of compressed air having suitable fittings.

In the variation of the invention shown in Fig. 8, the automatic air pressure gun 45ᵃ has a barrel or housing 46 which combines the coupling 16, the fitting 18 and the housing 22 heretofore described into a single unit which is air-tight when coupled with the container 12 by coacting threads 47. A soft rubber washer 48 fitted around the inside cylindrical surface of the opening 49 adjacent the cartridge 13 provides additional protection against leakage by pressing against the cartridge when advanced. In all other respects, the gun 45a is the same as the gun 11 with a barrel in one part and not separable at the threads 19 and 23, the gun 45ᵃ being provided with the finned container 12, the cartridge 13 with its puncturable seal 14, the pin 26 with its hollow shank 27, vents 28 and valve face 29, the spring 32 and disk 33, the air chamber 34, and valve seat 38 coacting with valve face 29 to form the air valve 39.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An automatic air pressure gun comprising a container, a compressed air cartridge, a barrel, a pin, a spring and a disk, the container being open at one end, the cartridge having a puncturable sealed end and being positioned within the container with its sealed end near the container opening, the barrel having an opening therethrough varying in cross section, the opening forming in sequence a comparatively spacious entrance at one end of the barrel, followed by a narrow tunnel, a central air chamber and a conical opening adapted for use as a valve seat, the pin having a conical head capable of coacting with the valve seat to form an air valve, the spring and disk being positioned on the shank of the pin, and the pin being positioned with its point, the disk and the spring in the spacious entrance, the shank fitting slidably in the narrow tunnel and extending through the air chamber, and the pin head or valve face fitting in the valve seat, the shank of the pin having an opening therein extending from the point to an outlet near the head in the air chamber, the disk being adapted to coact with the end of the cartridge to limit the movement of the pin, the spring acting on the disk and pin to keep the valve closed, and the container and barrel being detachably secured to each other by coacting threading means with the point of the pin aligned with the sealed end of the cartridge and capable of puncturing it as the container is threaded on the barrel, the pin being forced inwardly as the disk engages the end of the cartridge, opening the valve against the action of the spring.

2. An automatic air pressure gun comprising a barrel, a plunger in the barrel, the barrel having a clear-through opening extending longitudinally thereof and within which opening the plunger is endwisely slidable, said opening at two sections along its length fitting snugly enough around the plunger to check fluid pressure transfer between the exterior of the plunger and the interior of the opening where the opening surrounds the plunger at said two sections thereof, the plunger having a point at one end for piercing a puncturable cartridge containing fluid under pressure when relative movement occurs between the plunger and such cartridge to a predetermined extent, the plunger having an internal passage extending longitudinally along the same from said point, said opening having a lateral enlargement intermediate said two sections of the opening, said passage having a lateral continuation thereof terminating in a discharge port at the side of the plunger intermediate the ends thereof and said port being so located on the plunger that in all possible positions of the plunger said port will open into said enlargement, and valve means partially carried by the plunger and partially carried by the barrel, said valve means including a valve seat forming a subdivision of the length of said opening.

3. An automatic air pressure gun comprising a barrel, a plunger in the barrel, the barrel having a clear-through opening extending longitudinally thereof and within which opening the plunger is endwisely slidable, said opening at two sections along its length fitting snugly enough around the plunger to check fluid pressure transfer between the exterior of the plunger and the interior of the opening where the opening surrounds the plunger at said two sections thereof, the plunger having a point at one end for piercing a puncturable cartridge containing fluid under pressure when relative movement occurs between the plunger and such cartridge to a predetermined extent, the plunger having an internal passage extending longitudinally along the same from said point, said opening having a lateral enlargement intermediate said two sections of the opening, said passage having a lateral continuation thereof terminating in a discharged port at the side of the plunger intermediate the ends thereof and said port being so located on the plunger that in all possible positions of the plunger said port will open into said enlargement, and valve means partially carried by the plunger and partially carried by the barrel, said valve means including a valve seat forming a subdivision of the length of said opening, there also being a stop on the plunger to limit its sliding movement in the direction to pierce such cartridge, said stop being carried by the plunger adjacent to the point of the latter and being positioned on the plunger, relative to the direction of sliding of the plunger for cartridge-piercing, beyond both said sections of said opening, said stop being arranged to abut the cartridge, following further sliding of the plunger in cartridge-piercing direction after cartridge-piercing.

4. An automatic air pressure gun comprising a barrel, a plunger in the barrel, the barrel having a clear-through opening extending longitudinally thereof and within which opening the plunger is endwisely slidable, said opening at two sections along its length fitting snugly enough around the plunger to check fluid pressure transfer between the exterior of the plunger and the interior of the opening where the opening surrounds the plunger at said two sections thereof, the plunger having a point at one end for piercing a puncturable cartridge containing fluid under pressure when relative movement occurs between the plunger and such cartridge to a predetermined extent, the plunger having an internal passage extending longitudinally along the same from said point, said opening having a lateral enlargement intermediate said two sections of the opening, said passage having a lateral continuation thereof terminating in a discharge port at the side of the plunger intermediate the ends thereof and said port being so located on the plunger that in all possible positions of the plunger said port will open into said enlargement, valve means partially carried by the plunger and partially carried by the barrel, said valve means including a valve seat forming a subdivision of the length of said opening, there also being a stop on the plunger to limit its sliding movement in the direction to pierce such cartridge, said stop being carried by the plunger adjacent to the point of the latter and being positioned on the plunger, relative to the direction of sliding of the plunger for cartridge-piercing, beyond both said sections of said opening, said stop being arranged to abut the cartridge, following further sliding of the plunger in cartridge-piercing direction after cartridge-piercing, there further being a container for such cartridge, and there also being means partially carried by the container and partially carried by the barrel whereby the container may be advanced to move the cartridge toward the plunger point with the puncturable part of the cartridge foremost, there further being a spring on the plunger between said stop and that one of said sections of the said opening which is the one nearer to the container, the spring being sufficiently tensioned to cause the plunger to pierce the cartridge on a first movement of the container toward the barrel and to cause the stop to abut the cartridge on a further movement of the container toward the barrel, the tension of the spring nevertheless being such that, following said abutting, further movement of the container toward the barrel acts through the stop to slide the plunger in retrograde direction, thereby to open said valve means and so discharge fluid under pressure from the pierced cartridge by way of said channel, said port, said enlargement, and said valve means.

IRVING AUSTIN GOLDMAN.

REFERENCES CITED

The following references are of record in the file of this patent:

UNITED STATES PATENTS

| Number | Name | Date |
| --- | --- | --- |
| 872,812 | Giron | Dec. 3, 1907 |
| 2,120,297 | Reinecke | June 14, 1938 |